Nov. 9, 1948.   J. J. BLACK   2,453,617
TAILGATE FOR HIGHWAY VEHICLES
Filed June 6, 1945   2 Sheets-Sheet 1

INVENTOR.
James J. Black
BY
Wood, Arey, Herron & Evans
attorneys

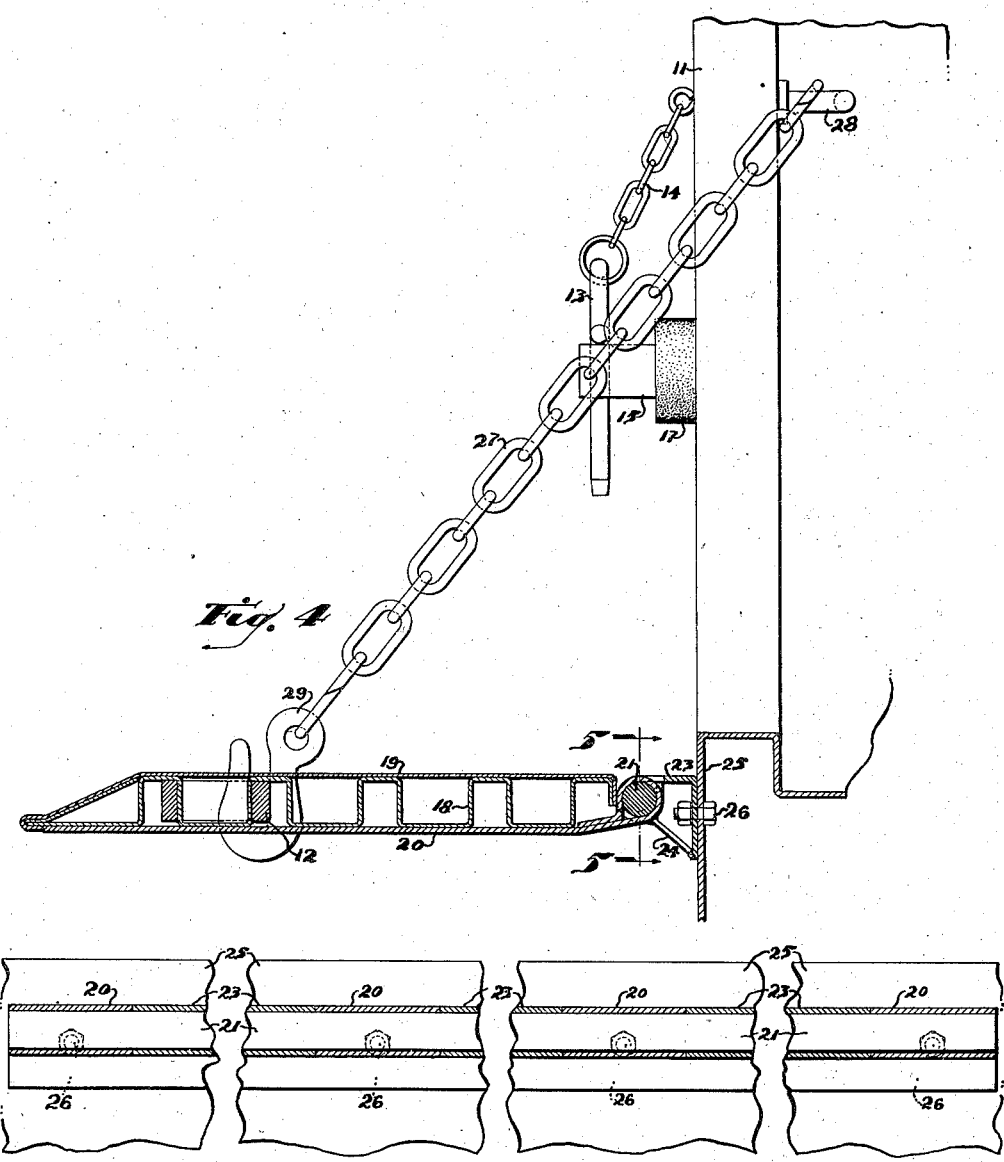

Patented Nov. 9, 1948

2,453,617

UNITED STATES PATENT OFFICE 2,453,617

TAILGATE FOR HIGHWAY VEHICLES

James J. Black, Cincinnati, Ohio, assignor to The Trailmobile Company, Cincinnati, Ohio, a corporation of Delaware Application June 6, 1945, Serial No. 597,794

8 Claims. (Cl. 296—57)

This invention relates to tailgates for highway vehicles such as trucks, trailers and the like, and is particularly concerned with a structure which is exceedingly strong and sturdy in operation but which, due to the particular construction which will be hereinafter described, is substantially lighter than similar structures in use at the present time.

It has been conventional in the past to construct tailgates from hard wood reenforced by metal bands or in some cases from hard wood wholly or partially encased between metal plates. These constructions are all comparatively heavy, and accordingly, somewhat cumbersome to manipulate. In addition, the wood being frequently exposed to the elements tends to deteriorate with greater rapidity than the vehicle body and being subjected to blows and contacts tends to split or splinter thereby presenting an unsightly appearance, and in some instances, interfering with the efficiency of operation.

One of the objects of the present invention has been to form a tailgate entirely of metal in which the elements are so arranged and disposed as to provide a structure which is substantially stronger but still substantially lighter than the conventional wood and metal tailgates now in use.

Another object has been to provide an all metal tailgate in which the interior section is formed from a corrugated strip with the corrugations so configurated and disposed as to give maximum rigidity.

Another object has been to utilize the hinge straps of the tailgate as transverse bracing elements in an all metal tailgate construction including a corrugated central section.

Another object has been to provide an all metal tailgate of unitary construction having a corrugated central section in which a maximum degree of strength and rigidity is attained utilizing a minimum number of parts.

Other and further objects and advantages will be apparent from the further and more detailed description of the invention when considered in conjunction with the drawings in which:

Figure 4 is a sectional view similar to Figure 2 showing the tailgate secured in extended position.

Figure 5 is a sectional view along the line 5—5, Figure 4.

Figure 1:
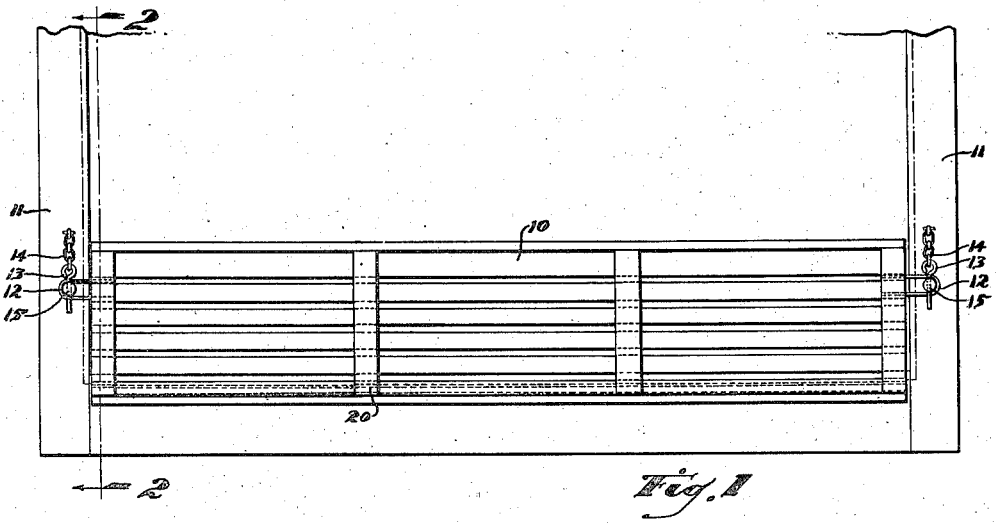
Figure 1 is a side elevation of a tailgate embodying the preferred construction of the invention in raised or vertical position on the rear end of a highway vehicle such as a trailer or truck.

Referring again to the drawings for a further and more detailed description of the invention, a tailgate embodying the preferred construction of the invention has been designated generally as 10 and in Figure 1 is shown in upright position secured to the rear corner posts 11 of the body of a highway vehicle.

The attachment elements for securing the tailgate in upright position include loops 12 secured integrally to the tailgate and extending laterally around the studs 15 which project outwardly from and are rigidly secured to the rear corner posts 11 of the vehicle.

Cotter pins 13 affixed to the ends of chains 14 are inserted through apertures 16 in the ends of the studs 15. To prevent rattling, rubber collars 17 may be inserted around the studs 15 between the tailgate and the vertical posts, this construction being best illustrated in Figure 2.

Figures 2, 3:
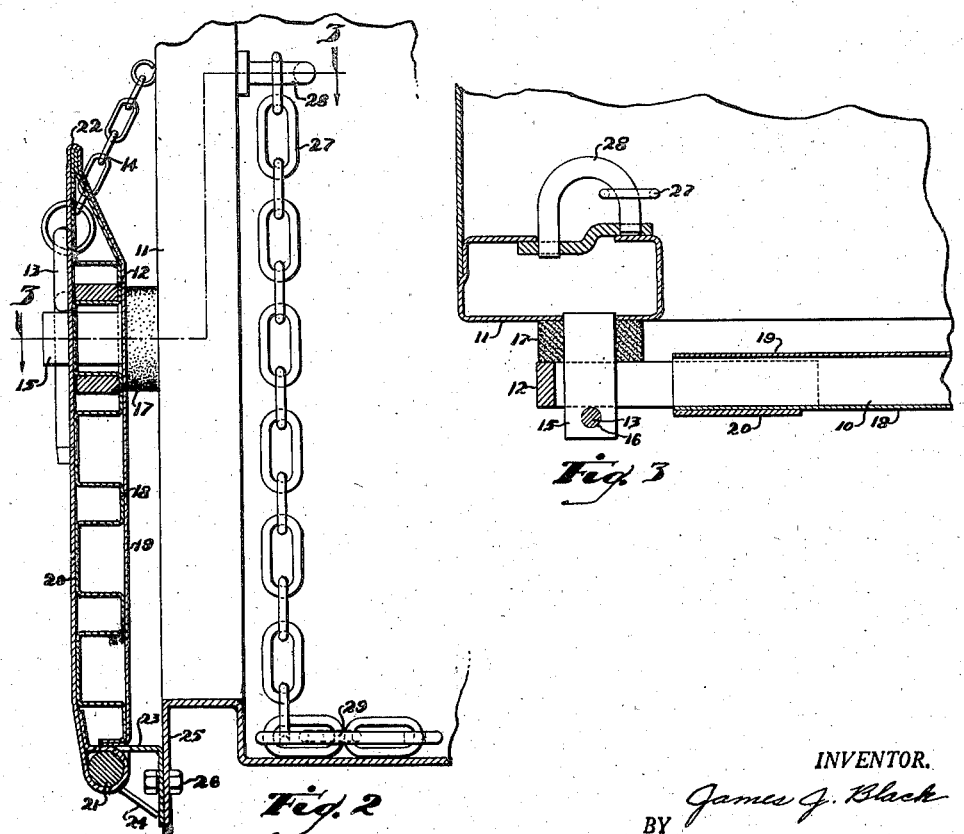
Figure 2 is a sectional view along the line 2—2, Figure 1.
Figure 3 is a sectional view along the line 3—3, Figure 2, particularly illustrating the means provided for securing the tailgate in upright or extended position as the case may be.

The construction of the tailgate itself is best illustrated in Figures 2 and 4. The inner section 18 is formed from a sheet or plate of corrugated metal such as steel. In the preferred construction the corrugations are alternately wide and narrow with the openings of the wider corrugations being disposed toward the surface of the tailgate which will be uppermost when it is extended. A steel plate 19 extends across the entire upper surface of the tailgate and preferably is spot welded to the closed ends of the narrow corrugations. Hinge straps 20 are disposed transversely across the under side of the tailgate and have one end thereof configurated to form a loop encircling the shaft 21. These hinge straps provide transverse bracing for the tailgate and also perform the conventional function of hinges. The end of the tailgate which forms the outer edge when the tailgate is in extended position is preferably tapered outwardly and downwardly with the upper plate 19 secured to one end of the corrugated plate 18 to form a reenforced projection 22. This is for the purpose of facilitating the loading of very heavy objects which must be pushed over the tailgate and into the vehicle.

A hinge bracket 23 is positioned adjacent the inner edge of the tailgate and has its outward projecting edge configurated to encircle the shaft 21 in the area between the hinge straps 20. This portion of the bracket may be integrally secured to the shaft 21 as by welding although in the preferred form the shaft is permitted to rotate. A supporting plate 24 is rigidly secured as by welding to a vertical leg of bracket 23 and is also welded to the under side of the hinge loop of bracket 23 for reenforcing and supporting this bracket. The hinge bracket 23 may be secured to a second bracket 25 depending from the lower surface of the corner post 11 of the vehicle as by the bolt designated 26.

A chain for holding the tailgate in extended position has been designated 27 and may be secured at one end to the loop 28 extending forwardly from the rear post of the vehicle. A hook 29 is secured to the other end of this chain. When the tailgate is in extended position, as illustrated in Figure 4, the end of the hook 29 may be inserted in the loops 12 as best shown in Figure 4.

The construction of the tailgate proper is one which is particularly strong and rigid, much more so than the conventional combinations of wood and metal now in use. Lengthwise bracing is effectively provided by the corrugated inner plate particularly on the under surface of the tailgate. The plate 19 provides further lengthwise bracing on the upper surface and also provides a surface which is absolutely smooth and not subject to wear. Effective transverse bracing is provided by the hinge straps 20. The hinge arrangement is one which is particularly strong and rigid and in which there is little or no danger of a failure due to strain and breakage. In the case of both the hinge arrangement and the tailgate proper the desired result has been accomplished with a minimum of parts and a minimum of difficult labor operations, forming and welding being practically all that is required.

While I have described herein a preferred embodiment of my invention, it is apparent that various changes and modifications may be made in the exact construction illustrated without departing from the substance of the invention as set out in the ensuing claims.

Having fully described my invention, I claim:

1. A tailgate for a highway vehicle, comprising a plate formed from corrugated metal with the corrugations extending transversely of the vehicle body, a flat plate positioned on the upper surface of the corrugated plate and secured thereto, and hinge straps secured to the lower surface of said plate and extending substantially across the tailgate transverse to the corrugations, said hinge straps providing transverse bracing for the tailgate.

2. An all metal tailgate for a highway vehicle comprising a plate formed from corrugated metal with the corrugations extending transverse of the vehicle body, certain of said corrugations being substantially wider than others, the mouths of said wider corrugations being disposed toward the upper surface of the tailgate, a flat plate extending continuously over the upper surface of the corrugated plate and secured thereto and a plurality of hinge straps secured to the under surface of the corrugated plate at spaced points, said hinge straps extending substantially across the corrugated plate and providing transverse bracing thereto.

3. In combination with a highway vehicle having a shaft rigidly secured to the rear end thereof transversely to the body of the vehicle, a tailgate pivotally mounted on said shaft, said tailgate comprising a corrugated plate, a flat plate extending continuously over the upper surface of the corrugated plate and forming a loading surface and a plurality of hinge straps rigidly secured to the under surface of the corrugated plate and pivotally secured at their ends to the shaft on the vehicle body, said straps providing transverse bracing for the tailgate.

4. In a tailgate for highway vehicles, a corrugated metal plate forming a section for said tailgate, the corrugations in said plate extending transversely of the vehicle body, hinge straps rigidly secured to the under surface of said corrugated plate at spaced points and providing transverse bracing therefor and an upper plate extending continuously over the upper surface of the corrugated plate and secured thereto, said upper plate having its outwardly extended edge tapered downwardly to provide an inclined surface for loading heavy articles.

5. In a tailgate for highway vehicles, a corrugated metal plate forming a section for said tailgate, the corrugations in said plate extending transversely of the vehicle body, hinge straps rigidly secured to said corrugated plate and extending across the corrugations to provide transverse bracing therefor, the ends of said straps being adapted to be pivotally secured to the vehicle body, and a substantially flat plate disposed above the corrugated plate to provide a smooth loading surface.

6. A tailgate for highway vehicles comprising a corrugated metal plate forming a section for said tailgate, the corrugations in said plate extending transversely of the vehicle body, a plurality of hinge straps extending across the under surface of the corrugated plate transverse of the corrugations to provide cross bracing for said inner plate, the ends of said hinge straps being adapted to be pivotally secured to the vehicle body and a substantially flat upper plate disposed on the upper surface of the corrugated plate to provide a smooth loading surface, said plates and straps being entirely formed from metal and being integrally welded together to form a substantially light and strong unitary structure braced in both directions.

7. A tailgate for a highway vehicle comprising: a corrugated plate, a flat plate extending continuously over the upper surface of the corrugated plate, said flat plate being spot welded to said corrugated plate and forming a loading surface, a plurality of hinge straps extending across the undersurface of said corrugated plate at right angles to the corrugations thereof, said hinge straps being spot welded to said corrugations whereby said flat plate and said hinge straps are maintained rigidly in spaced relationship to provide a unitary beam structure.

8. A tailgate for a highway vehicle comprising: a corrugated plate, a flat plate extending across the upper surface of said corrugated plate and welded thereto, a plurality of straps extending across and welded to the undersurface of the corrugated plate at right angles to the corrugations thereof, the opposite ends of said straps and said flat plate being joined together to constitute a beam in which the flat plate and strap members respectively constitute the compression and tension members of the beam.

JAMES J. BLACK.

REFERENCES CITED

The following references are of record in the file of this patent:

UNITED STATES PATENTS

| Number | Name | Date |
| --- | --- | --- |
| 196,986 | McLennan | Nov. 13, 1877 |
| 697,949 | Schofield | Apr. 15, 1902 |
| 1,040,011 | Priebe | Oct. 1, 1912 |
| 1,139,458 | Ledwinka | May 11, 1915 |
| 1,388,896 | Sage | Aug. 30, 1921 |